United States Patent [19]
LaBoda

[11] 3,966,131
[45] June 29, 1976

[54] METHOD AND MACHINE FOR MAKING TWISTED WIRE BEADS FOR TIRES

[75] Inventor: John Albert LaBoda, Fairview Park, Ohio

[73] Assignee: Advance Manufacturing Corporation, Cleveland, Ohio

[22] Filed: June 3, 1974

[21] Appl. No.: 475,614

Related U.S. Application Data

[63] Continuation of Ser. No. 283,178, Aug. 23, 1972, abandoned, Continuation-in-part of Ser. No. 190,753, Oct. 20, 1971, Pat. No. 3,801,028.

[52] U.S. Cl. ............................ 242/4 BE; 156/362; 156/422; 242/7.02
[51] Int. Cl.² ........................................ B65H 81/02
[58] Field of Search ................ 242/4 BE, 4 R, 4 B, 242/4 C, 7.21, 7.02, 7.03; 156/460, 422, 136; 245/1.5; 152/362

[56] References Cited
UNITED STATES PATENTS

| | | | |
|---|---|---|---|
| 2,727,698 | 12/1955 | Stevens | 242/4 B |
| 3,132,816 | 5/1964 | Oshima | 242/4 C |
| 3,191,878 | 6/1965 | Kitano | 242/4 R |
| 3,446,446 | 5/1969 | DeBruin | 242/4 C |
| 3,481,549 | 12/1969 | Cullen et al. | 242/7.21 X |

FOREIGN PATENTS OR APPLICATIONS 679,117   1/1930   France .............................. 242/4 BE

*Primary Examiner*—Billy S. Taylor
*Attorney, Agent, or Firm*—Bosworth, Sessions & McCoy

[57] ABSTRACT

A method and machine for making wire beads for tires wherein the beads comprise one or more wire filaments helically wrapped around a solid metal core ring. The metal core ring is of circular cross section and is supported in a transport mechanism that revolves it about its axis of symmetry while a reel of filaform material is orbited about an axis tangent to a fixed reference line perpendicular to the orbit axis. Thus, the filaform material is wrapped around the core ring in a helical path about the circular axis defined by the center of the core ring cross section. The pitch of the helical wrap is adjusted to place each convolution of the filament in a predetermined spaced relation to the next preceding convolution.

12 Claims, 20 Drawing Figures

(FINAL WRAP)

(LOAD-UNLOAD)

3,966,131

METHOD AND MACHINE FOR MAKING TWISTED WIRE BEADS FOR TIRES

CROSS REFERENCE TO RELATED APPLICATION

This application is a continuation of U.S. patent application Ser. No. 283,178 filed Aug. 23, 1972, now abandoned, as a continuation-in-part of U.S. application Ser. No. 190,753 filed Oct. 20, 1971, now U.S. Pat. No. 3,801,028, which are made a part hereof and incorporated by reference herein.

BACKGROUND OF THE INVENTION

This invention relates to the manufacture of metal bead rings for pneumatic tires and especially to bead rings comprising filaform elements helically wound or wrapped about a circular core member for use in radial tires.

In the manufacture of pneumatic tires, a metal bead ring is generally applied to opposite ends of a number of superposed plies of rubber-coated fabric wrapped around a cylindrical tire building drum. The ends of the fabric plies are turned up over the rings which are ultimately embedded in rubber between the plies to form the beads of the vulcanized pneumatic tire. While many types of both multi-filament and mono-filament bead rings have been used, current practices are believed to favor multi-filament beads due to their superior strength and flexibility.

It is desirable that the filament have a helical wrap about the circular axis of symmetry defined by the cross section of the bead in order to provide for some resilient radial expansion of the bead ring as well as for other resilient flexing. The cross sectional form of the bead is also an important factor, a fairly smooth form being desirable in order to reduce the possibility of tearing or cutting of the plies by sharp edges of the bead. A better securing of the bead to the rubber is achieved where the cross section of the bead is irregular rather than completely round. Accordingly, it is desirable to have a bead formed of filaments helically wrapped about a circular axis of symmetry and circumferentially spaced apart to define helical grooves therebetween for anchoring the rubber plies to the bead ring. Furthermore, it is desirable that the wire filaments be of long lengths sufficient for several convolutions, rather than of short lengths extending only one convolution and requiring the connecting together of the ends of each length for each complete loop. It is also desirable that the assembled bead as viewed in cross section have adjacent convolutions of wire tangent to one another as well as to the core ring.

One such type of helically wrapped multi-filament bead ring utilizes a circular core ring about which the outer filaments are helically wrapped while another type is of coreless construction and formed, for example, in the manner described in U.S. Pat. No. 3,251,384. The present invention is directed to the manufacture of helically-wrapped, multifilament, solid-core-type bead rings.

Machines of the prior art for forming bead rings, grommets and the like of helically wrapped wire, such as the machines described in U.S. Pat. Nos. 1,294,160, 1,327,170 and 1,414,828 of Pratt, generally pass a lead length of wire through a circular path to form a ring and then continue to revolve the ring about its axis of symmetry. The supply reel or spool feeding the wire is orbited around and through the ring in correspondence with the speed of rotation of the ring about its axis of symmetry. The revolving ring, at it is formed, pulls the wire from the reel and the ring is progressively enlarged until its formation is complete.

The mechanism for rotating the ring varies and can comprise stationary driver rollers, an endless chain with an arcuate span, an endless belt, etc. It is, of course, esssential that the ring run through an open or free unsupported span or gap wherein the wire being supplied may be laid onto the ring. The wire being fed from the reel is often fed through a die that orbits with the spool and which is adapted to form a helical twist in the wire to facilitate its wrapping.

Most of the prior art machines, however, are not adapted to form helical convolutions of wire around a prefabricated core ring—especially a core ring of a substantially larger diameter than the wire. None of the prior art machines are capable of placing each successive helical convolution of wire at a uniform circumferential spacing from the next adjacent convolution on the core ring and none place the wire so accurately relative to the core ring that the leading end of the first laid convolution registers accurately with the trailing end of the last laid convolution.

A particular problem encountered in the past with machines of the type described is that as the wire is fed onto the core ring or the like from an orbiting reel, an axial twist is produced in the wire (as opposed to a helical twist about the circular axis of the core ring as defined by the centroid of the ring's cross section) thus causing the wire to have a tendency to unwind.

Another problem is that in the formation of a bead of the type described above, where a relatively thin wire is helically wrapped progressively around a core ring of relatively large diameter, the helices must be laid and spaced tangent to one another around the circumference of the core ring cross section and the number of the helices in each convolution must be very accurately controlled so that the ends of the wire at the first and last convolution may be connected to one another.

The method and apparatus of the present invention, reduce the difficulties inherent in the prior art and afford other features and advantages heretofore not obtainable.

SUMMARY OF THE INVENTION

It is among the objects of the invention to provide a bead ring for pneumatic tires that has a plurality of helically wrapped filaments uniformly circumferentially spaced from one another to define helical grooves therebetween in order to achieve an interlocking effect with the rubber-coated fabric carcess plies of a pneumatic tire.

Still another object is to produce a bead ring for pneumatic tires of the type defined wherein the helically wrapped wire is free of any axial twist.

A further object is to hold and revolve a core ring about its axis of symmetry so that progressive portions are advanced through a fixed unsupported circumferential span for the purpose of wrapping filamentary material therein, wherein the means for holding the core ring accommodates the progressive enlargement of the annular article gripped while still maintaining uniform gripping force.

These and other objects are accomplished by wrapping one or more continuous lengths of filamentary wire material around a core ring in a helical path by holding the core ring and revolving it about its axis of symmetry. The holding and revolving is accomplished by engaging the surface of the core ring throughout a major circumferential portion thereof but leaving a free unsupported circumferential fixed span or section through which the ring is progressively transported. A reel with a supply of filamentary material is carried in an orbiting assembly that revolves in an orbital path about an axis tangent to the core ring in the free circumferential span. The axis of the spool is continuously maintained parallel to a fixed reference line to prevent any axial twist in the filamentary material. Accordingly, as the core ring is advanced, the filament is helically wrapped around it through a plurality of circumferential convolutions in such a manner as to uniformly space each convolution next to the proceeding convolution about the cross sectional circumference of the ring until the desired number of convolutions has been obtained. The resulting ends of the filament are joined together such as by welding to provide an endless wrap.

BRIEF DESCRIPTION OF THE DRAWINGS

FIG. 8 is a fragmentary sectional view taken on the line 8—8 of FIG. 4;

DESCRIPTION OF THE PREFERRED EMBODIMENT

Figure 1:
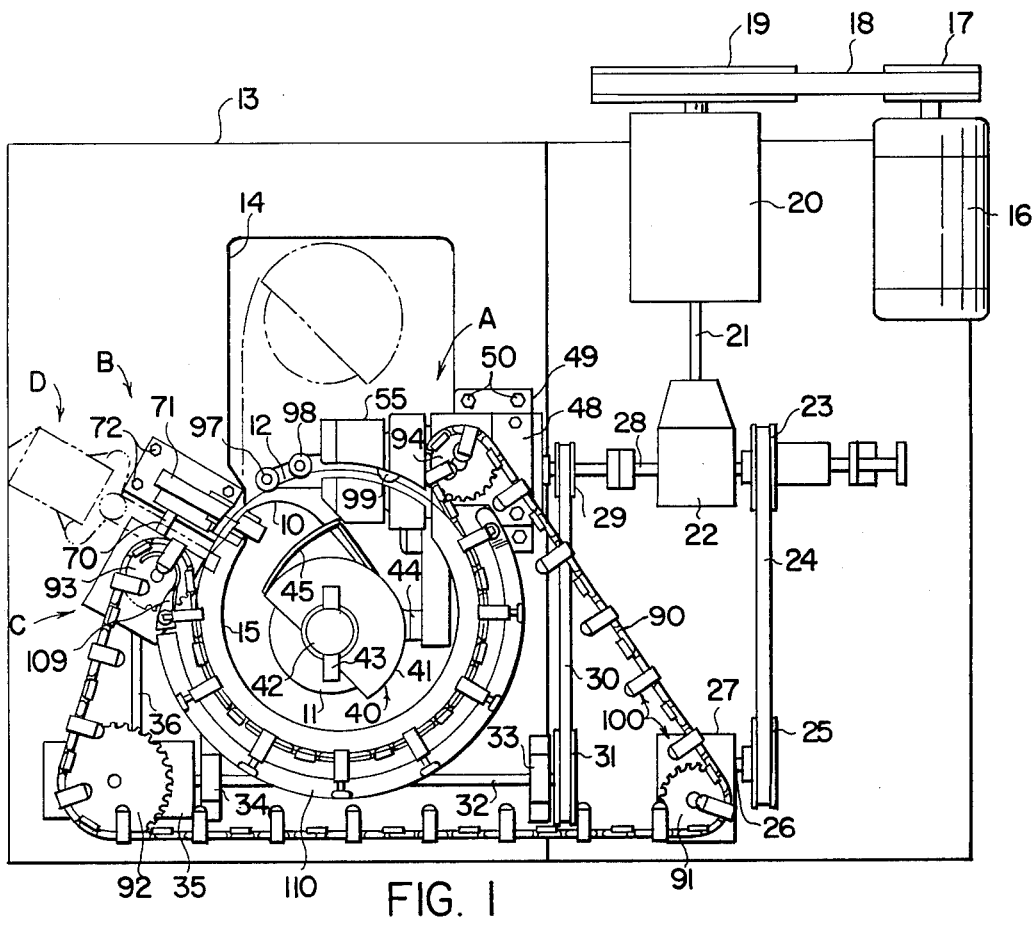
FIG. 1 is a plan view of a bead forming machine embodying the invention, the plane of the machine shown being angularly disposed relative to the horizontal and the view being taken perpendicular to the plane of the machine.
Figure 2:
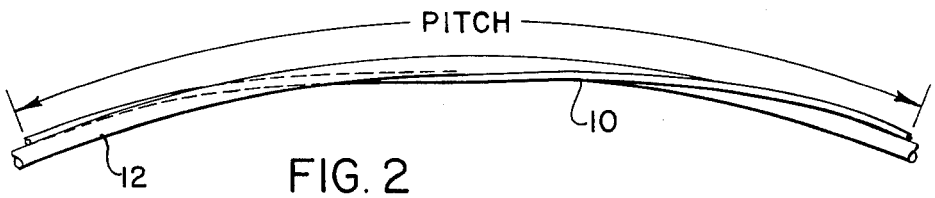
FIG. 2 is a fragmentary elevational view illustrating a portion of a core ring with one full wrap of helically wound wire filament placed thereon.

Referring more particularly to the drawings and initially to FIGS. 1 through 5 there is shown a machine for wrapping a length 10 of wire filament fed from a reel 11 about a core ring 12 as the core ring is revolved about its axis of symmetry. The core ring 12 is formed, for example, of 0.110 inch diameter high tensile spring steel wire and the length 19 of wire filament is typically of 0.050 inch diameter steel wire. FIG. 2 illustrates the manner in which the wire 10 is to be helically wrapped about core ring 12. As illustrated, the wire is to be laid in loose helices about an axis which is circular rather than straight as in the more conventional helical twisting application. One full pitch length is illustrated.

Figure 3:
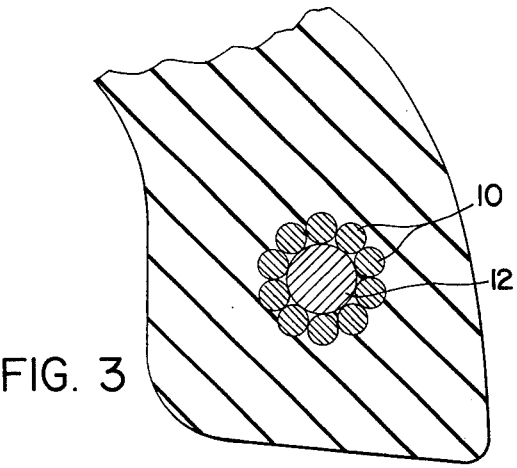
FIG. 3 is a fragmentary sectional view showing a bead ring made according to the invention and embeded in the side wall of a pneumatic tire.

A cross section of the desired product is illustrated in FIG. 3. The assembled bead comprises a core ring 12 and 10 continuous convolutions of wire 10 laid in a plurality of helices as illustrated in FIG. 2 adjacent one another in a circular pattern about the core ring 12, each of the 10 convolutions of wire being tangent to the two adjacent convolutions and also tangent to the core ring 12. As illustrated, the assembled bead is embedded in the side wall of a pneumatic tire to provide the necessary reinforcement and support for the tire in relation to the wheel rim on which it is mounted.

GENERAL ARRANGEMENT

Figure 4:
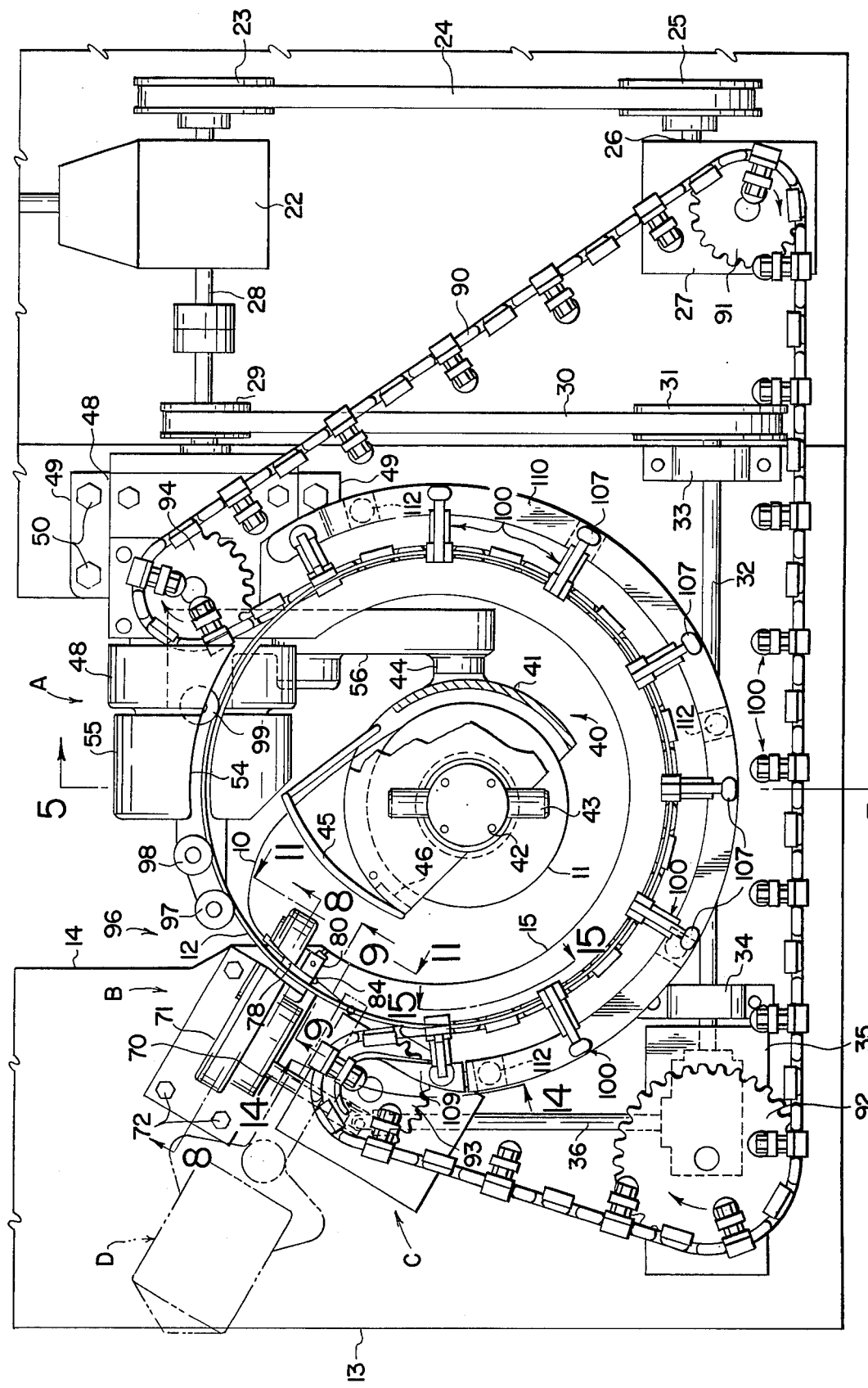
FIG.4 is a fragmentary plan view on an enlarged scale taken perpendicular to the plane of the machine as in FIG. 1.
Figure 5:
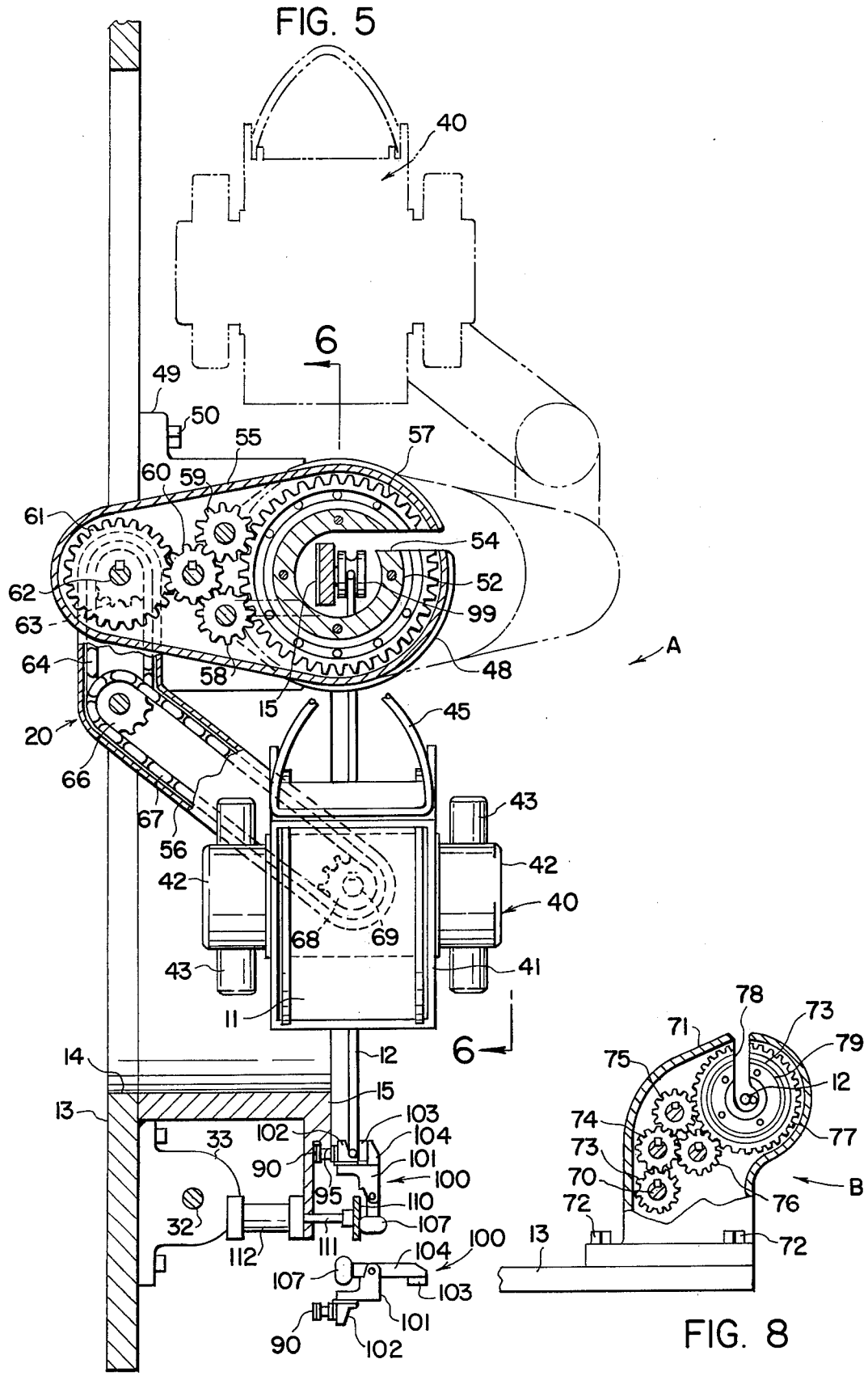
FIG. 5 is a fragmentary sectional view on an enlarged scale taken on line 5—5 of FIG. 4.

Referring initially to FIGS. 1, 4, and 5 the reel 11 is carried by an orbital wire feed assembly A mounted on a mounting plate 13 having an opening 14 to accommodate the orbital travel of the reel 11 and the respective portions of the orbital wire feed assembly A. The placement of the length 10 of wire on the core ring 12 is carefully and accurately controlled by means of a wire guide assembly B that is also supported on the mounting plate 13. As the reel 11 is orbited by the orbital wire feed assembly A and applied to the core ring by the wire guide assembly B, the core ring 12 is gripped and revolved about its axis of symmetry by a core ring transport assembly C supported on an annular supporting plate 15 spaced above the mounting plate 13. The mounting plate 13 is disposed to provide a tilted surface that slopes toward a machine operator at an angle of about 30° to facilitate access to the various working parts. As indicated in FIG. 5 the annular plate 15 is spaced several inches outwardly from the mounting plate 13.

It will be seen that the orbital wire feed assembly A is supported and driven for orbital travel about an axis tangent to the core ring 12 and that the wire guide assembly B is also adapted to orbit the length of wire fed from the spool 11 about another axis also tangent to the core ring 12. The orbital wire feed assembly A, wire guide assembly B and core ring transport assembly C are all driven by a drive motor 16 (FIG. 1) having an output pulley 17 driving a belt 18 that in turn drives a pulley 19 connected to a magnetic clutch unit 20. The clutch unit 20 has an output shaft 21 that connects to a right angle differential gear box 22. The gear box 22 has two outputs extending from the right and left hand sides of the box as viewed in FIGS. 1 and 4. At the right hand side of the box 22 is an output pulley 23 that drives a belt 24 connected to a pulley 25 mounted on a shaft 26 connected to a gear box 27. The gear box 27 has an output sprocket that drives the core ring transport assembly C as will be described in detail below.

Extending from the left hand side of the differential gear box 22 is a shaft 28 that drives the orbital wire feed assembly A in a manner to be described in detail below. Also mounted on the shaft 28 is a pulley 29 that drives a belt 30 connected to another pulley 31 mounted on a shaft 32. The shaft 32 is supported in bearing blocks 33 and 34 and is connected at its opposite ends to a differential gear box 35 with a right angle output shaft 36 that drives the wire guide assembly B as will be described in detail below.

Figure 11:
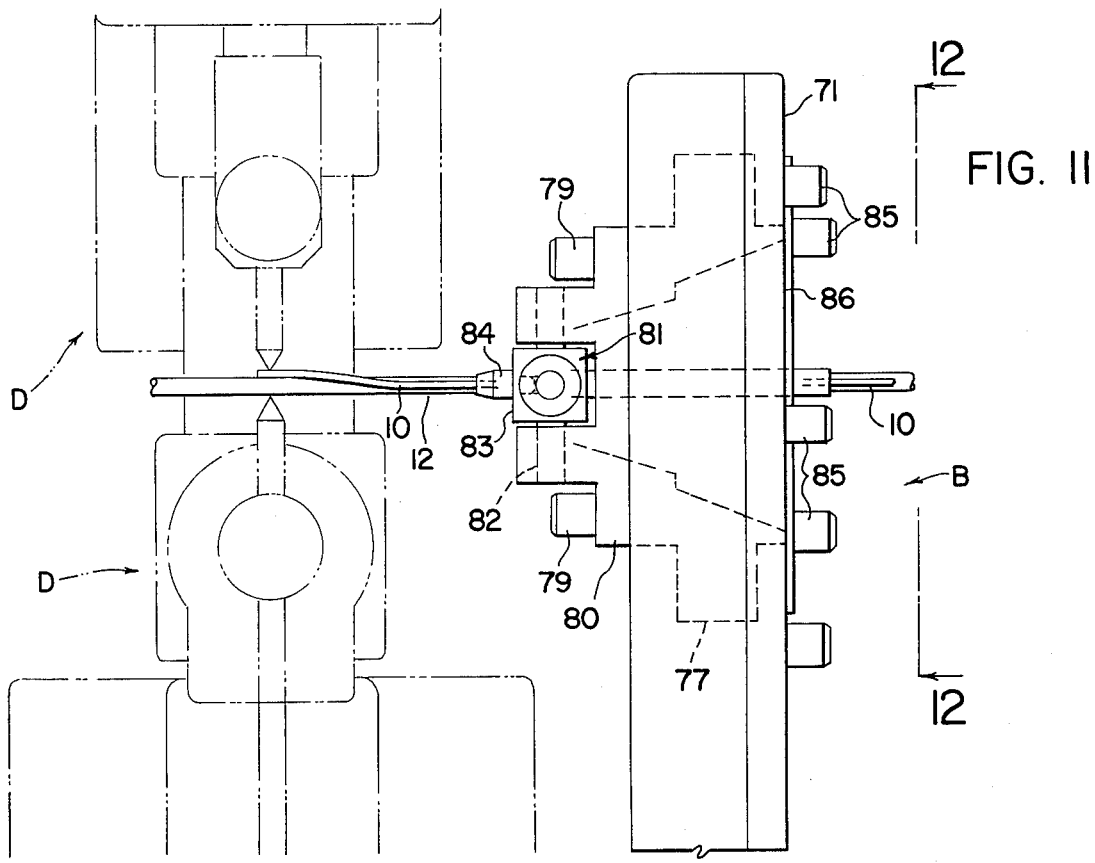
FIG. 11 is a fragmentary sectional view taken on the line 11—11 of FIG. 4.

A welding tool D indicated in dashed lines in FIGS. 1, 4 and 11 is used to spot weld the leading end of the wire 10 to the surface of the core ring 12 preparatory to the wrapping operation. The welding apparatus forms no part of the invention and is shown herein only for the purpose of illustrating one means for initially securing the end of the wire to the core ring. A typical spot welding head is sold commercially under the trade designation EB-1 by The Taylor-Winfield Corporation, of Warren, Ohio.

ORBITAL WIRE FEED ASSEMBLY

The orbital wire feed assembly A is best shown in FIGS. 2 and 4 through 7 and it will be seen that the arrangement in accordance with the invention is adapted to orbit the reel 11 with its axis maintained in a fixed orientation such that it is always in a fixed attitude relative to the mounting plate 13. This is accomplished by special gearing operably associated with the orbital drive arrangement described above.

The reel 11 is carried by an orbiting carrier assembly broadly indicated by the numeral 40 and which includes a pivotal housing 41 that generally serves as a yoke to support the axel of the reel. The housing 41 is in the form of part of a closed-end cylinder with a section of the cylinder removed by a plane spaced from and parallel to the cylinder axis to permit loading of the reel 11. The ends of the housing 41 are provided with journals 42 to support the axel of the reel 11 for free rotation. The journals 42 have lock pin assemblies generally indicated by the numeral 43 for use in releasing and locking the reel axel during loading and removal of reels.

Located in the center of the cylindrical wall of the housing is a pivotal connection 44 to permit the pivotal movement of the housing 41 relative to other portions of the orbital wire feed assembly A. The axis of the pivotal connection 44 is perpendicular to the reel axis and parallel to the mounting plate 13. The wire 10 from the reel 11 is guided by a skeletal guide rod assembly 45 best illustrated in FIGS. 4 and 5 which is adapted to guide the exiting length 10 of wire from the reel 11 throughout the entire orbit path. The wire 10 exits the housing 41 through an opening 45 in the top portion of the housing as best indicated in FIG. 4.

The orbiting carrier 40 is driven through its orbital path of travel by the shaft 28 described above under the heading "GENERAL ARRANGEMENT". The shaft 28 has a drive pin 47 keyed thereon and is journaled in a stationary housing 48. The housing 48 has flanges 49 that are bolted to the base plate 13 by bolts 50. The pinion 47 illustrated in FIGS. 6 and 7 meshes with external gear teeth formed on an annular flange 51 on a tubular cylindrical drive sleeve 52 that is journaled in a bearing sleeve 53 in the stationary housing 48 (FIG. 7).

Both the stationary housing 48, the drive sleeve 52 and the bearing sleeve 53 have a slot 54 formed therein so that a core ring to be mounted may be passed therethrough for location approximately in the center of the respective members. Prior to inserting a core ring 12 through the slot 54 it will be apparent that the drive sleeve 52 must be turned to a position in proper registration with the stationary housing 48 and bearing sleeve 53 to permit loading and unloading of a core ring 12 as will be described in detail below.

Figure 6:
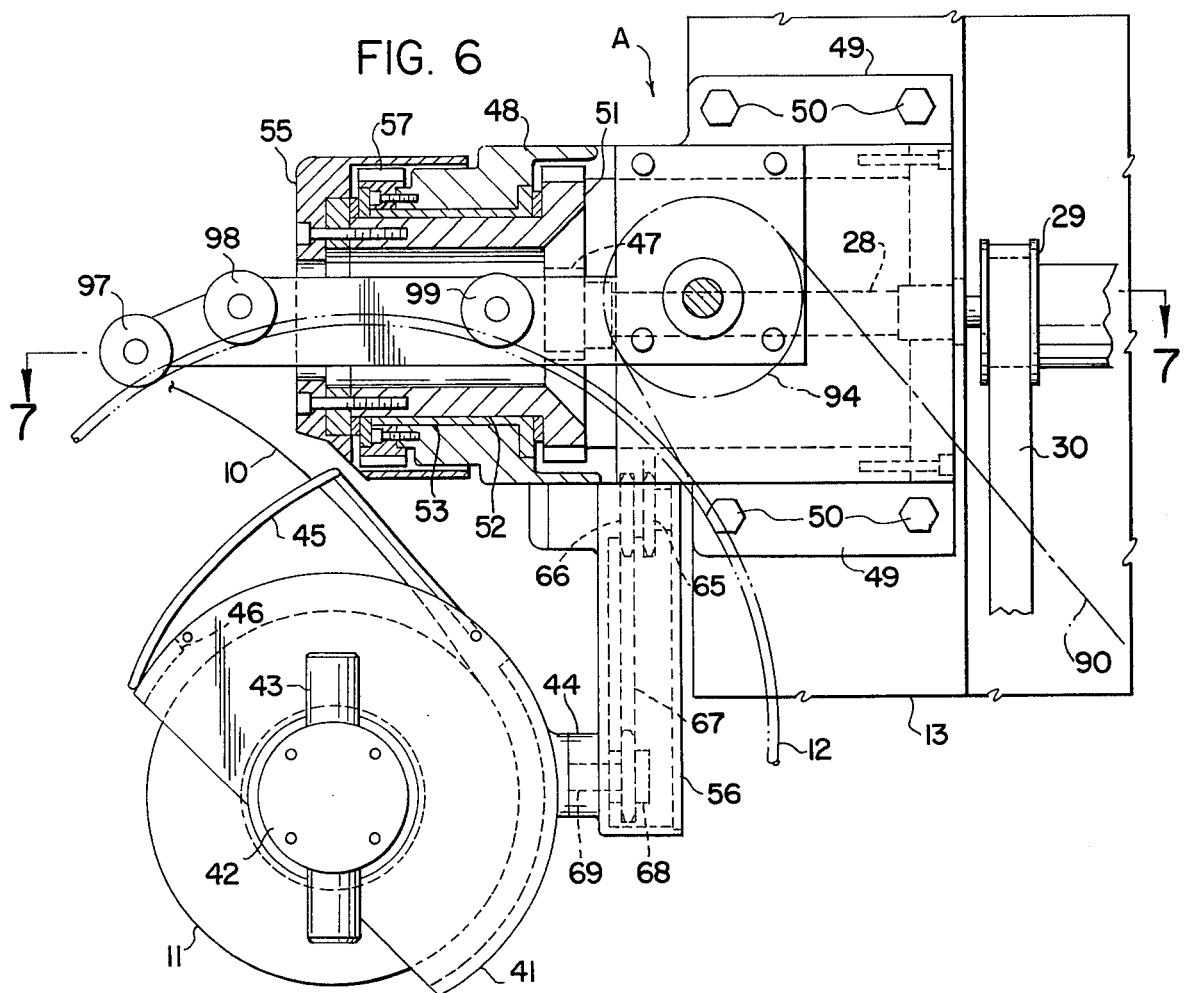
FIG. 6 is a fragmentary sectional view on an enlarged scale taken on the line 6—6 of FIG. 5.
Figure 7:
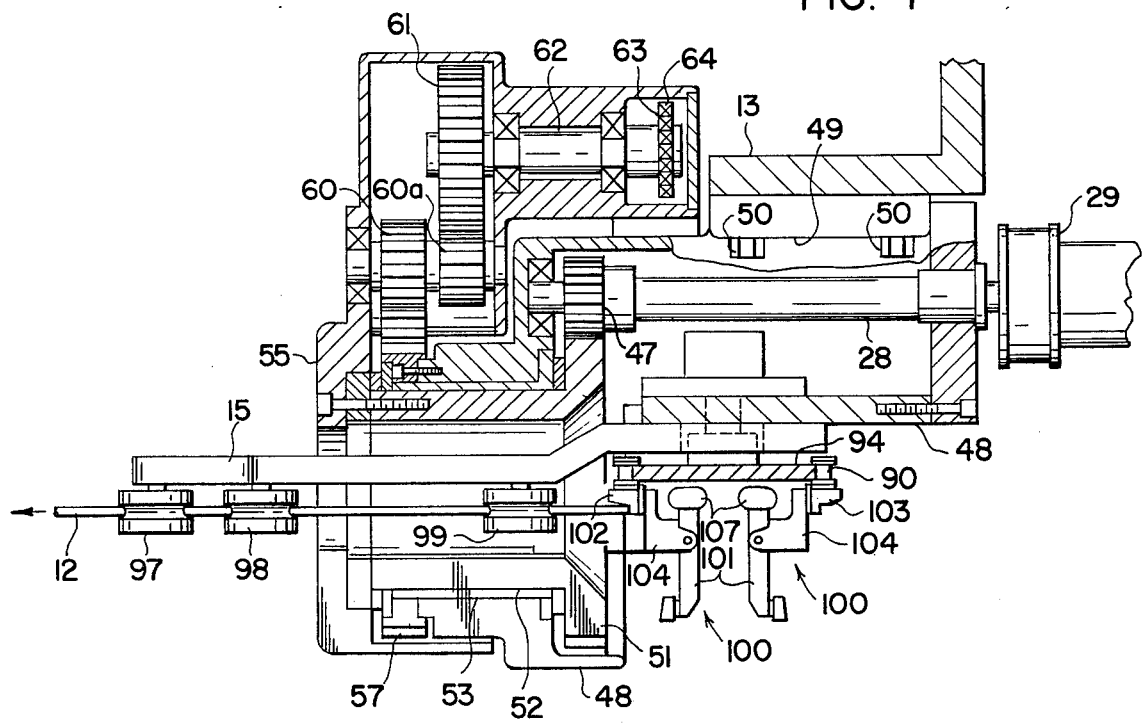
FIG. 7 is a fragmentary sectional view taken on the line 7—7 of FIG. 6.

The opposite or left hand end of the sleeve 52 as viewed in FIGS. 6 and 7 has bolted thereto an orbiting carriage that includes a main gear housing 55 and a carrier arm 56. Fastened to the stationary housing 48 is an annular gear 57 with external gear teeth that mesh with two idler gears 58 and 59 journaled in the gear housing 55 (FIG. 5). Two idler gears 58 and 59 are necessary in order to assure continuous meshing with the teeth of the annular gear 57 since the gear 57 is provided with a slot corresponding with the slot 54 discussed above. The idler gears 58 and 59 both mesh with another idler gear 60 also journaled in the gear housing 55.

The idler gear 60 is keyed to a shaft with another parallel idler gear 60a of a smaller diameter that meshes with a pinion 61 keyed to a shaft 62 journaled in a connecting portion between the gear housing 55 and the carrier arm 56. The opposite end of the shaft 62 has a sprocket 63 keyed thereon that turns an endless chain 64 which in turn turns another sprocket 65 journaled in the carrier arm 56. The sprocket 65 is keyed to a parallel sprocket 66 of identical diameter that turns another chain 67. The chain 67 turns still another sprocket 68 keyed to a shaft 69. The shaft 69 extends through the pivotal connection 44 that connects the housing 41 of the orbiting spool carrier to the carrier arm 56 and is rigidly connected to the housing 41 so that the housing is turned with the sprocket 68. Thus, the shaft 69 causes relative pivoting of the reel 11 in such a way as will be apparent to those skilled in the art from the gearing arrangement, that the reel 11 is orbited with its axis always in a fixed attitude and orientation in accordance with the invention.

WIRE GUIDE ASSEMBLY

The wire filament 10 from the spool 11 is guided to and placed in the proper location on the surface of the core ring 12 by means of the wire guide assembly B. The wire guide assembly B as indicated above is synchronized precisely with the orbital movement of the orbital wire feed assembly A, the drive being taken from the pulley 29 mounted on the same shaft 28 that drives the orbital wire feed assembly A. From the pulley 29 the drive train extends to the shaft 36 which is connected through a universal coupling to the input shaft 70 of the wire guide assembly B.

Referring to FIG. 8 it will be seen that the shaft 70 is journaled in a housing 71 fastened to the mounting plate 13 by bolts 72. Within the housing 71 is a drive pinion 73 keyed to the shaft 70 and in mesh with an idler gear 74 also journaled in the housing 71. The idler gear 74 meshes with the pair of idler gears 75 and 76 journaled in the housing 71 and which in turn both mesh with an annular ring gear 77 having a slot 78. The two idler gears 75 and 76 are needed in view of the slot 78 to assure continuous mesh thereof with the ring gear 77. The slot 78 permits loading and unloading of a core ring 12 which must extend through the center of gear 77 as well as through the respective portions of the housing 71. The housing 71 is also slotted so that when the ring gear 77 is in proper registration with the slot in the housing, the loading and removal may be accomplished.

Figure 9:
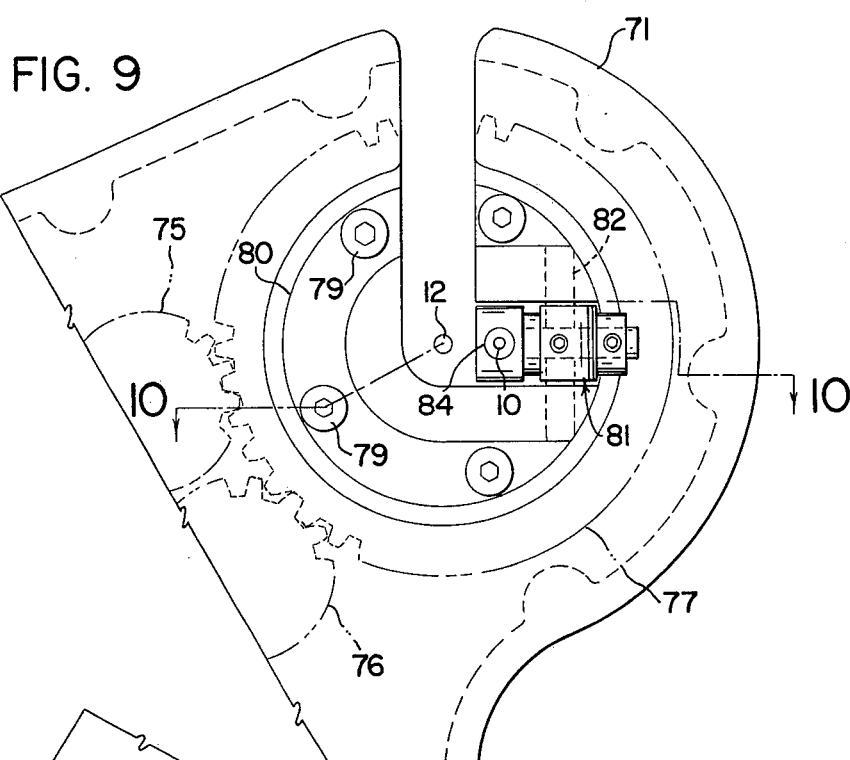
FIG. 9 is a fragmentary sectional view on an enlarged scale taken on the line 9—9 of FIG. 4.
Figure 10:
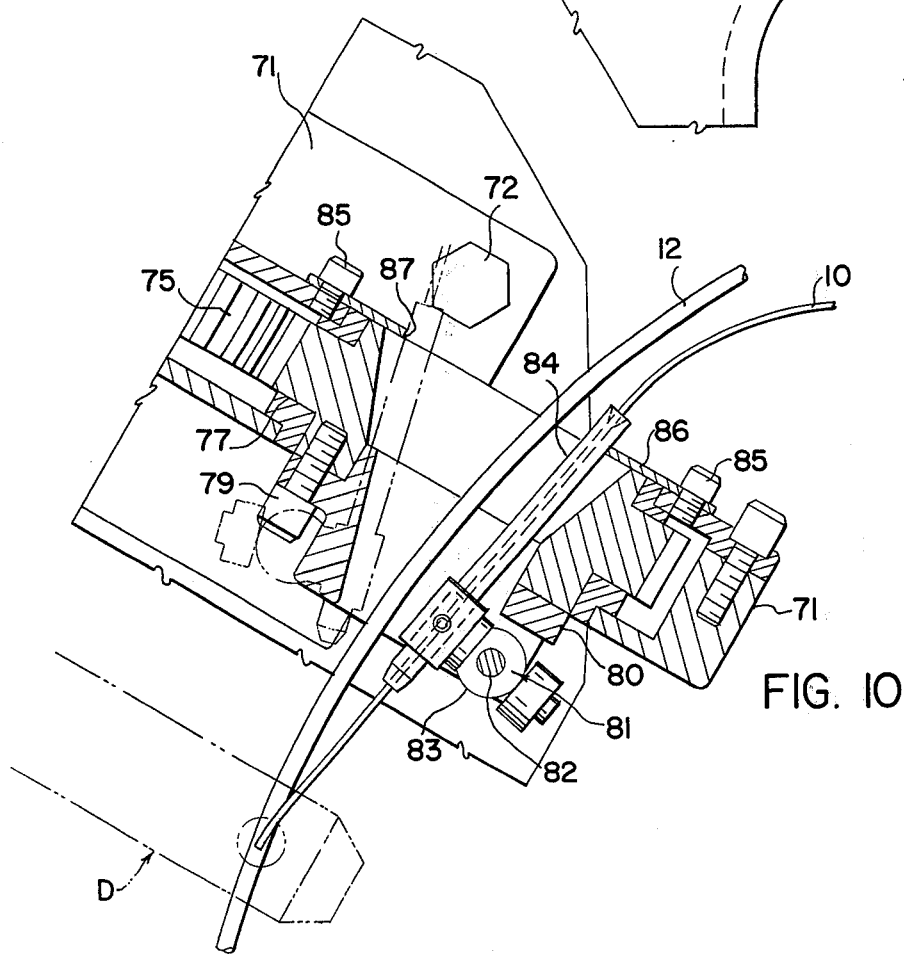
FIG. 10 is a fragmentary sectional view taken on the line 10—10 of FIG. 9.

Fastened to the annular ring gear 77 with bolts 79 is a wire guide carrier plate 80 which has a generally C shaped form and which is also slotted in correspondence with the ring gear 77. The carrier plate 80 is adapted to carry and support for pivotal movement a wrap control assembly 81 (FIGS. 9 through 13). The wrap control assembly 81 is pivotally connected on a pin 82 which is in turn journaled at its opposite ends in the carrier plate 80 (FIGS. 9 through 11). The wrap control assembly 81 includes a guide tube housing 83 pivotally supported on the pin 82 and a guide tube 84 mounted in the guide tube housing 83. The wrap control assembly 81 pivots about an axis in a plane perpendicular to the axis of the annular ring gear 77. Thus, the guide tube housing 83 and guide tube 84 are free to pivot about a moving axis as the tube 84 is orbited about the ring gear axis. Accordingly, the tube 84 is adapted in its travel to generate a conical surface as will be apparent from the discussion below. The clearance between the inside diameter of the tube and the wire is such that bending and permanent deformation of the wire in the tube is minimized or avoided.

Figure 12:
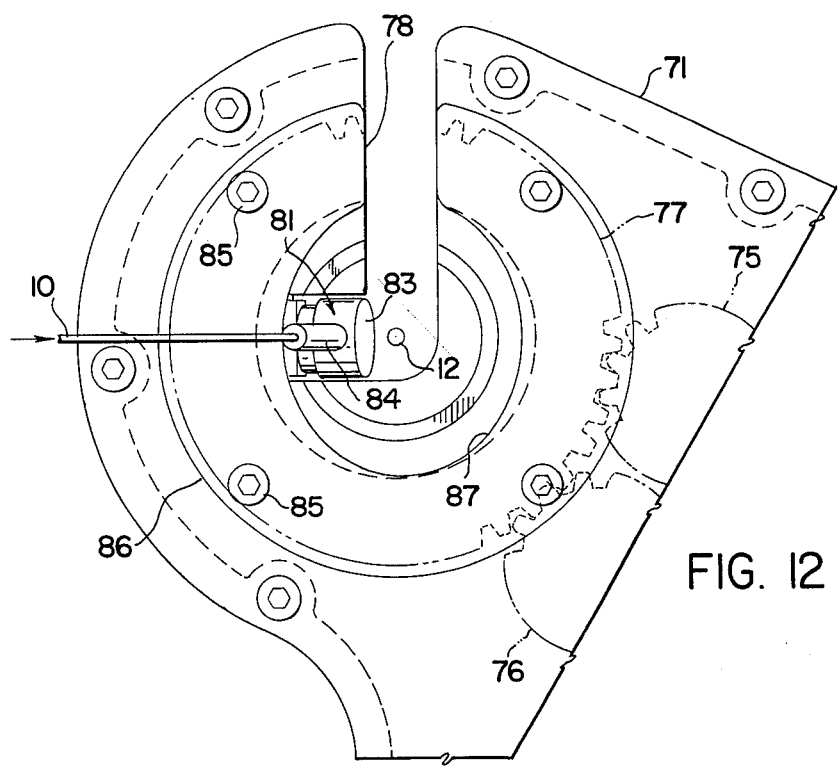
FIG. 12 is a fragmentary sectional view taken on the line 12—12 of FIG. 11.

Bolted to the opposite side of the housing 71 by bolts 85 is a cam plate 86 with a generally oval shaped opening 87 (FIG. 10, 11 and 12). The edges of the opening 87 are adapted to engage the rearward end of the guide tube 84 and thus, guide the pivotal movement of the tube about its pivot axis defined by the pivot pin 82 journaled in the carrier plate 80. In view of the oval shape of the opening 87 the combined orbital and pivotal movement of the guide tube 84 will define an irregular conical surface which is of generally oval form relative to the cone axis. The centrifugal force resulting from the orbital movement from the guide tube 84 will keep the tube engaged with the edges of the opening 87.

Figure 13:
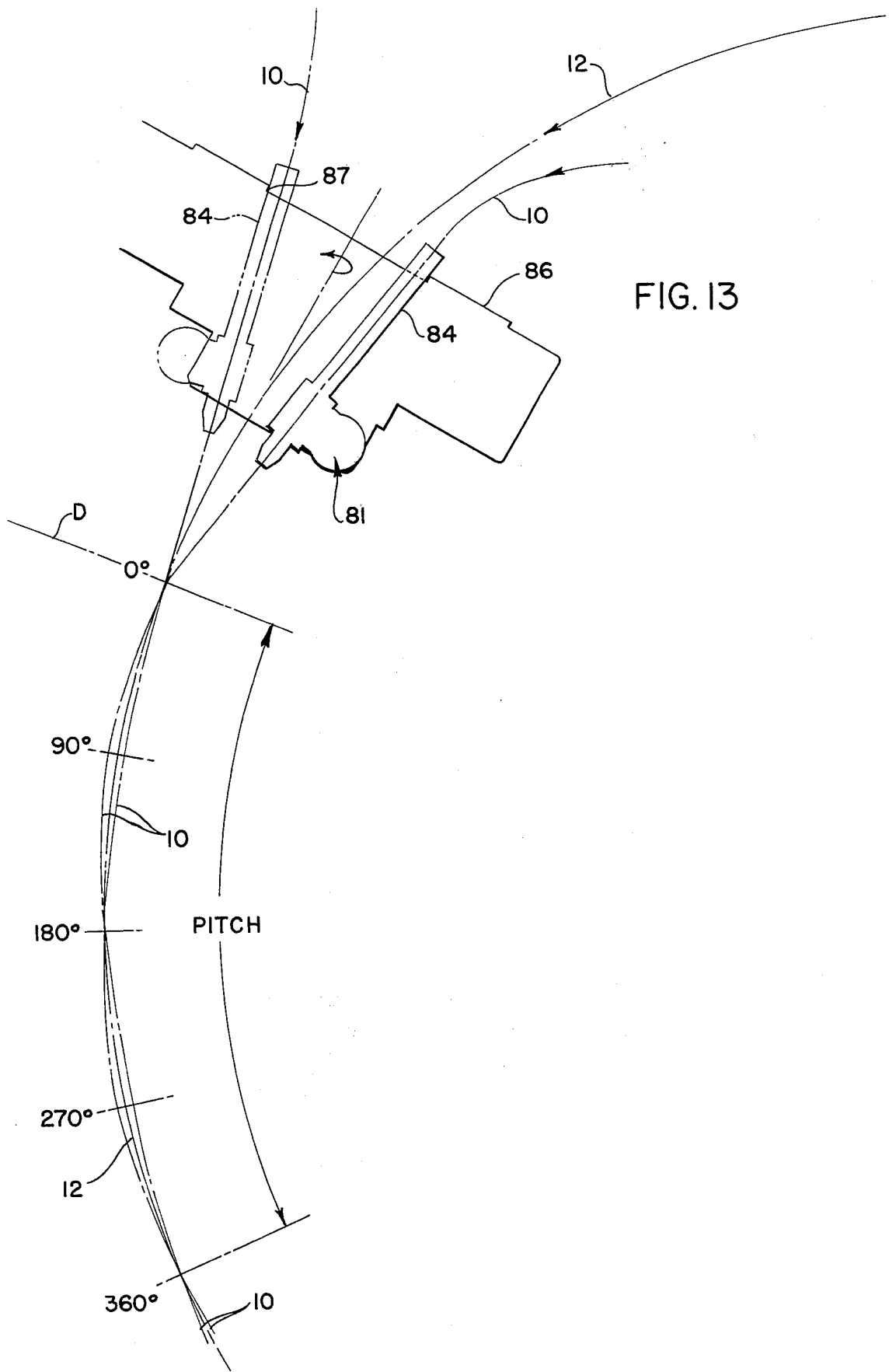
FIG. 13 is a diagram drawn to scale and illustrating various geometrical relationships of the wire guide assembly and core ring.

It will be noted that the point of application of the wire 10 to the core ring 12, as seen in FIG. 13, occurs at locations spaced approximately a half inch along the diameter of the core ring 12 from the feed tube 84 and thus the orbit axis for the annular ring gear 77 is not tangent to the circular center line of the core ring cross section at the point of application of the wire 10. Since the angle of feed of the wire 10 relative to a tangent line at the point of application to the core ring 12 should remain constant in order to achieve a uniform wrap it is necessary that the orbit axis be tangent at the point of application or that an adjustment be made to correct the error which would otherwise result. Since it is impractical to orbit the guide tube 84 about the axis tangent to the circuit center line of the core ring 12 at the point of wire application, the present arrangement is used.

It will be noted that the angle made by the guide tube 84 with the axis of its orbit varies considerably during its orbital movement, changing from approximately 20° to 35°. However, while this variation occurs it will be noted that the angle made by the guide tube 84 with a line tangent at the point the wire is applied to the core, remains constant. This is accomplished by the varying guide tube angle provided by its engagement with the cam plate 86.

CORE RING TRANSPORT ASSEMBLY

As indicated above, the core ring 12 is supported and turned about its axis of symmetry by the core ring transport assembly C mounted on the annular supporting plate 15. The construction and operation of the core ring transport assembly C is best illustrated in FIGS. 2 and 14 through 20. The assembly C includes and endless roller chain 90 that meshes with and is driven by a drive sprocket 91 mounted on the output shaft for the gear box 27. As described above under the heading "GENERAL ARRANGEMENT" the drive to the gear box 27 comes through a drive train including the motor 16, belt 18, clutch 20, right angle differential unit 22 and belt 24. Thus, it will be seen that the driving rotation of the sprocket 91 is synchronized with and has a direct speed relationship to the drive for the orbital wire feed assembly A and wire guide assembly B.

The roller chain 90 is guided through a path of travel that includes what will be termed herein an outer span and an arcuate generally C shaped inner span. The chain is guided in its outer span by a tensioning sprocket 92, an idler sprocket 93 and another idler sprocket 94 as well as by the drive sprocket 91. The inner span of the chain 90 extends between the idler sprockets 93, and 94 and the arcuate travel thereof is guided by an arcuate guide rim 95 integral with the annular supporting plate 15. The rollers of the chain 90 bear against and roll along the rim 95 so that the chain is guided in a very accurate circular path of travel in the inner span. The space between the ends of the inner span of the roller chain 90, (i.e., the lesser arc of the circle defined by the circular guide rim 95) is an open arcuate space or free circumferential section 96 which permits the orbital travel of the orbital wire feed assembly A and wire guide assembly B around and through the core ring 12.

In the arcuate space 96 the core ring receives some support from three idler rollers 97, 98 and 99 journaled on a portion of the annular supporting plate 15.

Figure 14:
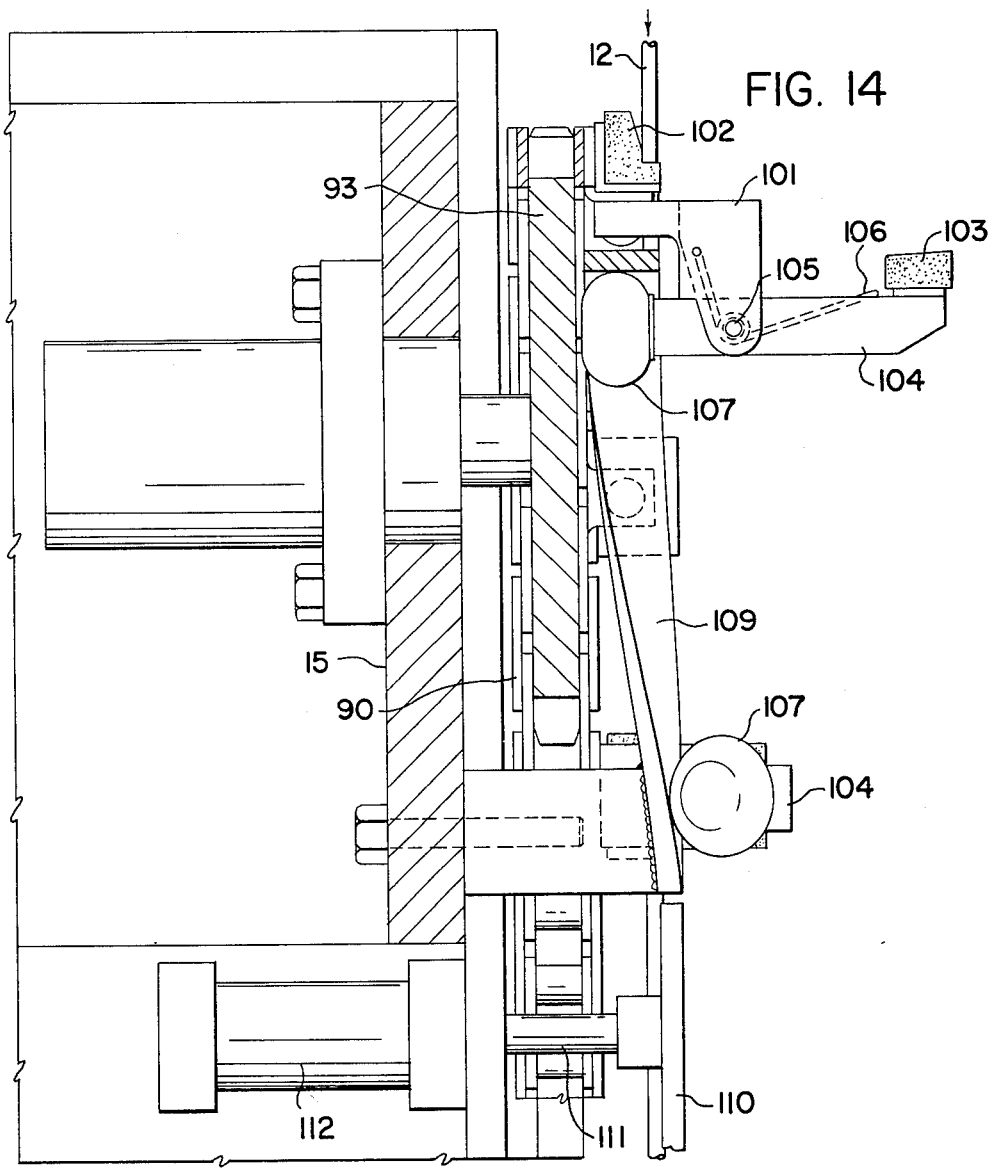
FIG. 14 is a fragmentary sectional view on an enlarged scale taken on the curved line 14—14 of FIG. 4 and illustrating a portion of the mechanism for clamping a bead ring as it is transported in a rotary path about its axis of symmetry.
Figure 15:
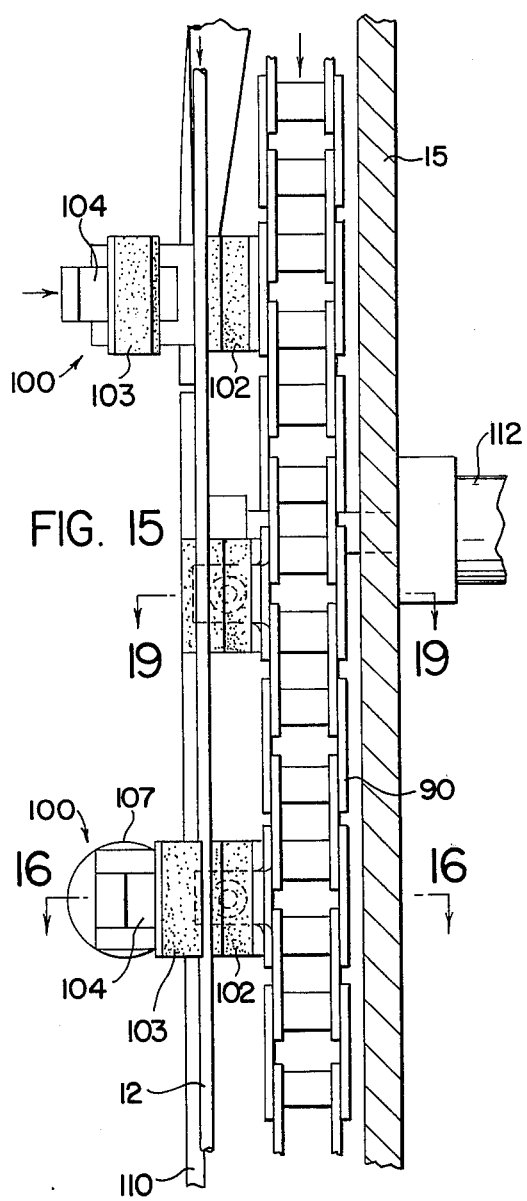
FIG. 15 is a fragmentary sectional view on an enlarged scale illustrating a portion of the bead ring clamping mechanism and taken on the curved line 15—15 of FIG. 4.

The core ring 12 is gripped in the major portion of its circumference and turned about its axis of symmetry with the roller chain 90 by means of 30 clamp assemblies 100 connected at uniformly spaced locations along the roller chain 90. In the embodiment shown one of the clamp assemblies 100 is connected to every fourth link of the chain as best illustrated in FIGS. 4, 14 and 15.

Figure 20:
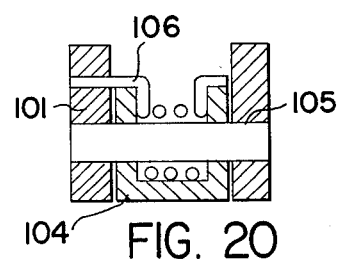
FIG. 20 is a fragmentary sectional view taken on the lines 20—20 of FIG. 16.
Figure 16:
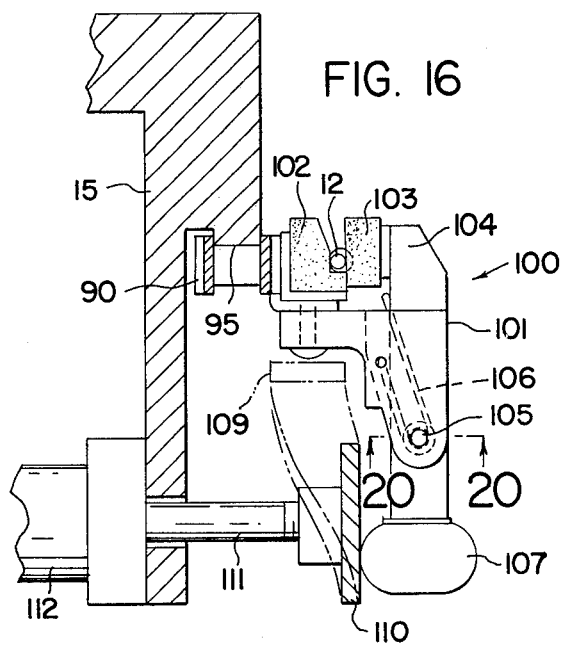
FIG. 16 is a fragmentary sectional view taken on the line 16—16 of FIG. 15 and illustrating a clamp assembly in its closed position.
Figure 17:
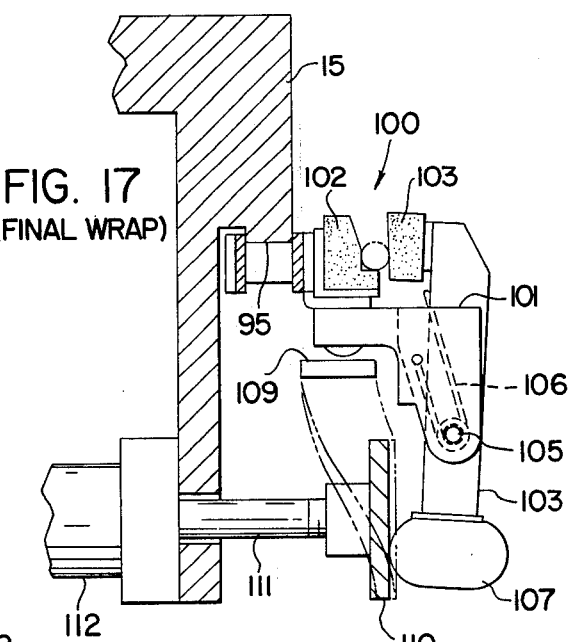
FIG. 17 is a fragmentary sectional view similar to FIG. 16 illustrating a clamp assembly in its closed position to grip a core ring and wire wrapped thereon in accordance with the invention.
Figure 18:
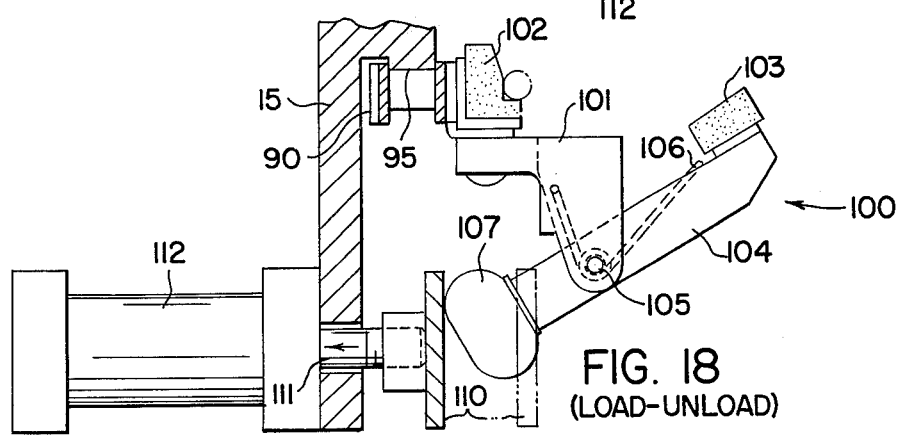
FIG. 18 is a fragmentary sectional view similar to FIGS. 16 and 17 and illustrating a clamp assembly in its partially open position preparatory to loading a core ring.

The construction and operation of the clamp assemblies is best illustrated in FIGs. 16 through 18. Each assembly 100 includes a bifurcated mounting bracket 101 attached to one link of the roller chain 90. The bracket has a fixed jaw 102 with a rubber gripping portion secured thereto. A movable jaw 103 also with a rubber gripping portion is located at one end of a lever 104 pivotally connected between the arms of the bracket 101 by a pivot pin 105. The lever 104 and movable jaw 103 are biased to an open position illustrated in FIGS. 14 and 18, by means of a torsion spring that 105 bears between the bracket 101 and the lever 103 (FIG. 20).

The end of the lever opposite the movable jaw 103 has a roller 107 journaled thereon, the roller being formed of a rigid low friction plastic material such as nylon. The lever 103 is pivotable between a closed position illustrated in FIGS. 16 and 17 and a full open position as illustrated in FIG. 14. The pivotal movement to the almost fully open position indicated in FIG. 18 permits the loading of a core ring 12 into all of the eight clamp assemblies 100 located in the inner span. The core ring 12 is loaded by placing it with its center corresponding to the center of the inner span and laying it on the fixed jaws 102.

The clamp assemblies 100 are operated by means of a ramp 109 (FIGS. 4 and 14) located at the entry of the inner span or at the location where the clamp assemblies 100 moving with roller chain 90 are initially carried into the inner span. The ramp 109 is located to engage the roller of each clamp when in its open position and it is located with the surface of the ramp initially perpendicular to the supporting plate. The ramp 109 defines a progressively twisting surface which ultimately reaches a condition where its surface is in a plane parallel to the supporting plate 15. The roller 107 as it progresses along the ramp 109 moves the lever to a closed clamping position as illustrated in FIG. 16. At the upper end of the ramp 109 the roller 107 passes onto an arcuate operating plate 110 that maintains the clamp assemblies 100 in a closed clamping condition to grip and turn the core ring throughout their travel in the inner span.

The operating plate 110 is supported on piston rods 111 extending from five spaced air cylinders 112 mounted below the annular supporting plate 15. The air cylinders 112 serve to move the plate 110 between a retracted position illustrated in FIG. 18 and an operating position indicated in FIGS. 14, 16 and 17. It will be apparent that the operating plate 110 must be retracted in order to permit loading of the core ring 12 so that the movable jaws 103 of the clamp assemblies 100 will not interfere with the placing of the core ring between the jaws 102 and 103.

The air cylinders 112 provide a resilient support for the operating plate 110 so as to maintain a uniform clamping pressure while still permitting the jaws to progressively increase their spacing as the cross-sectional size of a bead ring being formed increases ith the increasing length of wire 10 being wrapped around the core ring 12. Initially the spacing between the jaws 102 and 103 will be fairly small as illustrated in FIG. 16 to provide clamping force against the core ring with no wire wrapped thereon. At the terminal portion of the wrapping operation, however, the spacing between the jaws will be somewhat greater as illustrated in FIG. 17 and the resistance to clamping will result in the plate 110 giving slightly to force the piston rod 111 back somewhat into the cylinder 112.

The operation of the air cylinders 112 is controlled by an operator so that the clamps may be released to permit both removal of a completed bead ring and insertion of a new core ring 12 between forming operations.

Figure 19:
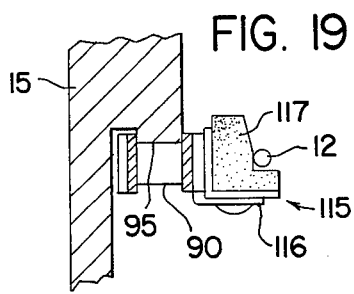
FIG. 19 is a fragmentary sectional view illustrating one of the core ring supporting elements.

Some additional support for the core ring 12 as it is revolved about its axis of symmetry with the roller chain 90, is provided by pad assemblies 115 best illustrated in FIGS. 4, 15 and 19. The pad assemblies 115, of which there are 30, are connected to every fourth link of the roller chain 90 and are located midway between the clamp assemblies 100. Each pad assembly 115 includes a bracket 116 and a resilient pad formed for example of rubber and being essentially the same form as the fixed jaws 102 of the clamp assemblies 100 (FIG. 19).

OPERATION

For the purpose of this description the operation of the machine will be described starting with the operating plate 110 retracted and the clamp assemblies 100 in a partially open condition (FIG. 18). Also, the slots 54 and 78 in the orbital wire feed assembly A and in the wire guide assembly B are in a condition of proper registration to permit insertion of a core ring 12 therethrough. Accordingly, the core ring 12 is placed in position by placing its respective portions through the slots and placing it against the fixed jaws 102 of the clamp assemblies 100 and pads 117 of the pad assemblies 115. The operator then operates the air cylinders 112 to close the clamps and grip the core ring 12 (FIG. 16).

At this point it will be assumed that a reel 11 is loaded in the housing 41 of the orbital wire feed assembly A. The end of the wire 10 from the reel 11 is taken through the guide frame 45 and inserted through the guide tube 84. The end of the wire is then placed against the surface of the core ring 12 and tack welded thereto using the welding unit D.

When this is accomplished the operator starts the drive motor 16 if it is not already started, and engages the clutch 20. The orbital wire feed assembly A, the wire guide assembly B and the core ring transport assembly C are thus operated simultaneously and in synchronization with one another. Both the orbital wire feed assembly A and the wire guide assembly B will orbit about their respective axis tangent to the circular center line of the endless core ring 12 at precisely the same rate of rotation and the rate of rotation will be accurately synchronized with the movement of the endless roller chain 90 as it turns the core ring 12 about its axis of symmetry. The result is that the wire 10 will be wrapped about the surface of the core ring 12 progressively in successives helices in the manner illustrated in FIGS. 2 and 13.

The pitch of the helices may be controlled by adjusting the orbit speed of the orbital wire feed assembly A and the wire guide assembly B relative to the velocity of the endless roller chain 90. It will be apparent that the geometrical relationships between the pitch of the wire, the circumference of the core ring 12, etc. will determine the configuration of the resulting bead ring. In the embodiment shown and with particular reference to FIG. 13, the wire 10 makes 10 complete turns or convolutions around the axis of symmetry of the core ring 12. In each turn or convolution the wire 10 completes slightly less than eight twists or helices around the core ring 12 or one helix in each 45° more or less of the core ring circumference. In order to lay successive convolutions of the wire 10 adjacent and contiguous to the next preceeding convolution it is necessary, where eight helices are completed aroung the circumference of the core ring, that either slightly more than or slightly less than a whole number of twists or helices are accomplished. Where there are to be ten complete convolutions of the wire 10 around the core ring 12 then either 79 twists or 81 twists must be selected. In the present case, the wire 10 at the completion of each convolution around the core ring 12 is spaced relative to the next succeeding turn or convolution, exactly 36° of arc about the circumference to provide the configuration illustrated in FIG. 3. Thus, after the 10 turns have been accomplished, there will be a total of either 79 or 81 complete twists or helices of wire 10 about the core ring 12. This illustrates the need for very accurate synchronization between the movement of the roller chain 90 and the orbit speed of the assemblies A and B.

Referring to FIG. 13 which is drawn to scale it may be seen that in the embodiment shown and described herein, the core ring has a diameter of about 13¾ inches and thus a circumference of about 43 inches. Consequently, since in this instance 7.9 helices are to be completed around the circumference, each helix will have a pitch of about 5.45 inches. The helix angle in this instance is about four degrees thirty minutes.

Once the 10 turns of the core ring 12 are completed (and thus 79 helices) the trailing end of the wire 19 is cut at the appropriate location, so as to register with the leading end of the wire which was initially tack welded to the surface of the core ring 12. Then the butting ends of the wire 10 are attached to one another such as by means of a clip, sleeve or any of a number of methods that will be readily apparent to those skilled in the art.

When the construction of the bead ring is completed the operator causes the air cylinders to retract the operating plate 110 to the position shown in FIG. 18 to release the clamp assemblies 100. Also if the orbital wire feed assembly A and wire guide asembly B are not properly positioned, they are turned as necessary until the slots 54 and 78 are completely opened. The bead ring is then removed from the machine and a new core ring 12 may be inserted. The reel 11 is preferably of sufficient size to supply wire for up to 100 bead rings. When the spring steel wire is wrapped on the core ring in accordance with this invention, there is a minimum of permanent deformation so that the springy and other characteristics of the wire are maintained in the fabricated bead.

While the invention has been shown and described with reference to a specific embodiment thereof this is intended for the purpose of illustration rather than limitation and other variations and modifications will be apparent to those skilled in the art all within the intended spirit of the scope of the invention. Accordingly, the patent is not to be limited in scope and effect to the specific embodiment herein shown and described nor in any other way that is inconsistent with the extent to which the progress in the art has been advanced by the invention.

I claim:

1. A machine for wrapping continuous lengths of filamentary wire material helically around the surface of a circular core ring comprising:
    an endless roller chain having an outer span and an arcuate inner span,
    an arcuate guide member adapted to be engaged by the rollers of said chain throughout said inner span,
    clamping means carried by said roller chain adapted to engage and resiliently grip said core ring and filamentary material wrapped thereon in said arcuate inner span around a major portion of the circumference of said core ring whereby said core ring is revolved with said inner span to transport successive portions of said core ring progressively across a free circumferential section in the space between the ends of said inner span,
    a reel with a supply of filamentary wire material mounted for rotation about its axis, and
    means for orbiting said reel about an axis tangent to said core ring with the axis of said reel parallel to a fixed reference line,
    whereby as said core ring is revolved, said filamentary material is progressively fed from said reel and helically wrapped around the surface of the free circumferential section of said core ring.

2. A machine as defined in claim 1 wherein said clamping means comprises a plurality of clamp assemblies secured at uniformly spaced locations on said roller chain and being operable between a clamping condition and a released condition and means for placing each of said clamp assemblies in clamping condition when the respective clamp assembly is carried by said chain into said inner span and for releasing said clamp assembly as said clamp assembly passes from said inner span to said outer span.

3. A machine as defined in claim 2 wherein said clamp assemblies each comprise a pair of jaws including a fixed jaw and a movable jaw, a lever pivotable about an axis intermediate its ends and generally parallel to the plane of said core ring and having an inner arm adapted to carry said movable jaw and an outer arm, means urging said lever to its open position and means for operating said outer arm to close said jaws when said clamp assembly is in said inner span.

4. A machine as defined in claim 3 wherein said means for operating said lever comprises a roller mounted on said outer arm and an arcuate operating plate located concentric with said inner span and adapted to be engaged by said roller and to cause lifting of said outer arm to close said jaws.

5. A machine as defined in claim 4 wherein said operating plate is urged outward toward said rollers by resilient means and wherein said operating plate may be lowered away from said rollers to permit said jaws to open in said inner span to facilitate placing of a core ring between said jaws.

6. A machine as defined in claim 5 wherein said resilient means comprises fluid pressure.

7. A machine for wrapping continuous lengths of filamentary wire material helically around the surface of a circular core ring comprising:
    motive means for resiliently gripping the surface of said core ring around a major portion of its circumference and for revolving said core ring therewith about its axis of symmetry to transport successive portions of said core ring progressively across a free circumferential section,
    a reel with a supply of filamentary wire material mounted for rotation about its axis,
    a tubular orbital housing located around a portion of the core ring to be wrapped,
    drive means for rotating said housing about an axis tangent to said core ring,
    a fixed annular gear surrounding said portion of said core ring,
    a carrier arm connected to said orbital housing and adapted to carry said reel for rotation relative to said arm about an axis perpendicular to the axis of said reel, and
    gear means carried by said orbital housing and arm and engaging said stationary ring gear, for turning said reel about said perpendicular axis of revolution for each full orbit of said reel so that as said reel is orbited about said axis tangent to said core ring, it maintains a fixed attitude and orientation throughout its orbital travel, whereby said filamentary material is progressively fed from said reel and wrapped around the free circumferential section surface of said core ring.

8. A machine for wrapping continuous lengths of spring wire helically around the surface of an endless core ring comprising:

clamp means for gripping the surface of said core ring at spaced locations around a major portion of its circumference, means carrying said clamp means for revolving said core ring therewith about its axis of symmetry to transport successive portions of said core ring progressively across the free circumferential section between the ends of the gripped circumferential section, a reel with a supply of wire mounted for rotation about its axis, means for orbiting said reel about an axis tangent to said core ring in an orbit extending through said core ring, and with said reel axis in the orbit plane, gear means operatively connected to said orbiting means for rotating said reel about an axis, extending perpendicularly through said reel axis, one counter-revolution for each full orbit of said reel whereby said reel axis is continuously parallel to a fixed reference line in said orbit plane, and a wire guide assembly synchronized with said orbiting means to apply wire to said core ring at a constant angle, whereby as said core ring is revolved, said wire is progressively fed from said reel through said assembly and wrapped around the surface of said core ring.

9. A machine as defined in claim 8 in which the wire guide assembly comprises a generally C-shaped wire guide carrier plate, a pivotally supported guide tube housing, a guide tube mounted in the guide tube housing, and a cam plate with a generally oval-shaped cam surface opening which engages the rearward end of the guide tube to cause it to apply the wire to said core at a constant angle.

10. A method for wrapping a continuous length of filamentary wire material helically around the surface of an endless circular core ring comprising the steps of:

gripping the surface of said core ring around a major portion of its circumference but leaving a free circumferential section, revolving said core ring about its axis of symmetry to transport successive portions thereof progressively across a free circumferential section, orbiting a reel of wire material about an axis generally tangent to said core ring and continuously maintaining the axis of said reel in its orbit plane and parallel to a fixed reference line, and guiding the length of said wire material from said orbiting reel through a conically orbiting tube at a constant angle to the surface of said core ring in said section, whereby said length is progressively wrapped helically around the surface of said core ring with a minimum of permanent deformation.

11. The method of claim 10 including the step wherein slightly less than or slightly more than a whole number of helices are laid down for each rotation of the core ring so that successive convolutions of wire are laid contiguously.

12. The method of claim 10 including the step wherein the orbital speed of the reel of wire material is adjusted relative to the speed of revolution of the core ring to thereby control the pitch of the helical wrappings of wire.

* * * * *